(12) United States Patent
Gerding et al.

(10) Patent No.: US 8,276,443 B2
(45) Date of Patent: Oct. 2, 2012

(54) METHOD OF USING A LEVEL METER EMPLOYING THE RADAR PRINCIPLE

(75) Inventors: Michael Gerding, Herne (DE); Thomas Musch, Mulheim/Ruhr (DE)

(73) Assignee: Krohne Messetechnik GmbH & Co. KG, Duisburg (DE)

(*) Notice: Subject to any disclaimer, the term of this patent is extended or adjusted under 35 U.S.C. 154(b) by 1035 days.

(21) Appl. No.: 12/028,282

(22) Filed: Feb. 8, 2008

(65) Prior Publication Data

US 2011/0167904 A1    Jul. 14, 2011

(30) Foreign Application Priority Data

Feb. 8, 2007    (DE) .................. 10 2007 007 024

(51) Int. Cl.
    *G01F 23/00*    (2006.01)
(52) U.S. Cl. ........................ 73/290 R; 324/642
(58) Field of Classification Search ............. 73/290 R
    See application file for complete search history.

(56) References Cited

U.S. PATENT DOCUMENTS

| | | | |
|---|---|---|---|
| 6,085,589 A | 7/2000 | Cruickshank | |
| 6,681,626 B2 | 1/2004 | Funfgeld | |
| 6,732,580 B2 * | 5/2004 | Dirksen | 73/149 |
| 6,795,015 B2 * | 9/2004 | Edvardsson | 342/124 |
| 6,828,930 B2 * | 12/2004 | Hagg | 342/124 |
| 2002/0017131 A1 | 2/2002 | Neuhaus et al. | |
| 2002/0026828 A1 | 3/2002 | Fehrenbach et al. | |
| 2003/0201842 A1 | 10/2003 | Gard | |
| 2004/0140814 A1 * | 7/2004 | Bletz et al. | 324/644 |
| 2005/0024259 A1 | 2/2005 | Berry et al. | |
| 2006/0225499 A1 | 10/2006 | Gravel et al. | |

FOREIGN PATENT DOCUMENTS

| | | |
|---|---|---|
| CA | 2325174 | 6/2001 |
| CA | 2325174 A1 | 6/2001 |
| CA | 2423781 A1 | 3/2003 |
| DE | 19510484 C2 | 10/1996 |
| DE | 198 20 839 A1 | 11/1999 |
| DE | 20016962 | 4/2002 |
| EP | 0780665 | 6/1997 |
| WO | WO-2006/031564 A2 | 3/2006 |

* cited by examiner

*Primary Examiner* — Hezron E Williams
*Assistant Examiner* — Gregory J Redmann
(74) *Attorney, Agent, or Firm* — Cesari and McKenna, LLP; John F. McKenna

(57) ABSTRACT

A method of using of a level meter employing the radar principle, serving to measure the fill level of a medium in a container and incorporating an electric conductor system for conducting an electromagnetic signal into the container and returning reflected components of the electromagnetic signal from the container, the electric conductor system terminating at a predefined level in the container. In practicing the method a variation of the component of the electromagnetic signal reflected at the container-oriented end of the conductor system is utilized as an indicator of the attainment of the predefined fill level by the medium. This permits the detection of very small amounts of a medium for instance in the monitoring of drain pipes, spillway basins or leak-detection systems.

6 Claims, 2 Drawing Sheets

METHOD OF USING A LEVEL METER EMPLOYING THE RADAR PRINCIPLE

BACKGROUND OF THE INVENTION

This invention relates to a level meter that employs the radar principle for measuring the fill level of a medium in a container and features an electric conductor system for conducting an electromagnetic signal into the container and returning reflected components of the electromagnetic signal from the container, said electric conductor system terminating at a predefined level in the container. A level meter of this type is described in DE 102 40 550 A1.

The measuring process in a level meter that employs radar technology and features an electric conductor system for conducting an electromagnetic signal into and back from a container is based on the time domain reflectometry (TDR) principle that has been used, for instance, in cable testing and resembles the mode of operation of conventional radars. For example, a TDR level meter of this type transmits an extremely short electric pulse via an essentially straight electric conductor into a container holding a medium such as a liquid, powder or granular substance whose fill level is to be determined. The electric conductor system is typically designed as a single or dual conductor that extends into the medium. If the electric conductor system is composed of dual conductors, these may be, for instance, in the form of two parallel lines or of a coaxial cable.

In the case of a dual-conductor configuration, an electric pulse fed into it practically travels "between" the two conductors into the container, where it is at least partially reflected off the surface of the medium and the reflected component of the short electric pulse is typically received by a processing electronics unit that measures the signal runtime and thus the level of the medium in the container. The reflected component of the short electric pulse varies as a function of the dielectric constant or specific inductance capacity of the medium and increases as the latter increases. The signal runtime is proportional to the level of the medium in the container. Varying environmental conditions, such as increasing or decreasing atmospheric pressures or ambient temperatures do not negatively affect the measuring accuracy of the TDR level meter. Moreover, the run-time of the signal is unaffected by the dielectric constant of the medium whose level is to be measured.

Conventional level meters employing the radar principle and featuring an electric conductor system of the type described above have so-called "dead zones", which are fill-level regions of the medium that either cannot be measured, or are measured in a highly imprecise fashion at best. Due to physical discontinuities in the area of the conductor system around the immersion point in the container, there will generally be an "upper dead zone", with a "lower dead zone" at the end of the conductor system closest to the bottom of the container. These dead zones generate relatively strong reflected components of the electromagnetic signal which tend to be significantly superimposed on the signal component reflected by the medium in these regions. The existence of such dead zones is generally viewed as a drawback compromising the level measurements made by means of the level meter.

SUMMARY OF THE INVENTION

It is the objective of this invention to introduce a method of using a level meter, employing the radar principle, that offers an added benefit to the user of the equipment.

Based on the use first described above, this objective is achieved by utilizing a change in the component of the electromagnetic signal that is reflected at the end of the conductor system as an indicator to the effect that the medium has reached the predefined level at which the electric conductor system terminates.

Thus, according to the invention, the interference caused by the reflection at the lower end of the conductor system, so far considered to be nothing but a performance-impairing drawback, is used for detecting when the medium has reached that predefined level in the container. In other words, the level meter that employs the radar principle is provided with a threshold-value detection function that identifies a level of the medium in the container at which the medium barely or no longer touches the end of the conductor system. Such detection may serve to indicate in the case of a container being filled that the medium has just reached the end of the conductor or, conversely in the case of a receding level, that the medium has dropped below the predefined threshold level.

The conductor system may be configured essentially along a variety of geometries, especially in the form of rods and tubes as well as cables serving as conductors. In a preferred implementation of the invention, the conductor system employed is an open-ended conductor pair. In that preferred implementation of the invention, the two conductors are electrically insulated from each other at their respective ends in the container. This configuration offers the advantages described further below, although it should be noted that, in essence, it would also be possible to use an impedance-matched design in which the two conductor ends would be interconnected for instance via an electric resistance.

A preferred embodiment of the invention provides for the open ends of the conductor pair to be optimized in terms of their sensitivity to capacitive variations that occur especially in non-conductive media. In particular, this can be achieved by providing the ends of the two conductors of the conductor pair with mutually different geometries. Specifically, in a preferred embodiment of the invention, the two conductors of the conductor pair extend into the container to different depths. If the dual conductor is in the form of a coaxial cable, the core conductor will preferably be set back in relation to the outer conductor.

A different signal shape and/or amplitude may be used to provide the variation of the component of the electromagnetic signal that is reflected at the end of the conductor system. However, in a preferred embodiment of the invention, that variation of the component of the electromagnetic signal that is reflected at the end of the conductor system is in the form of a polarity reversal of the signal. In the case of liquids with a relatively high dielectric constant or high electric conductivity, an open-ended conductor pair will result in a complete polarity reversal of the reflected signal the moment the conductor end makes contact with the liquid. This polarity reversal can be detected dependably and unambiguously and can thus serve as the monitoring criterion for the attainment of the predefined threshold level.

The following will explain this invention in detail by describing a preferred embodiment thereof with reference to the attached drawing figures.

DESCRIPTION OF AN PREFERRED EMBODIMENT

Figure 1:
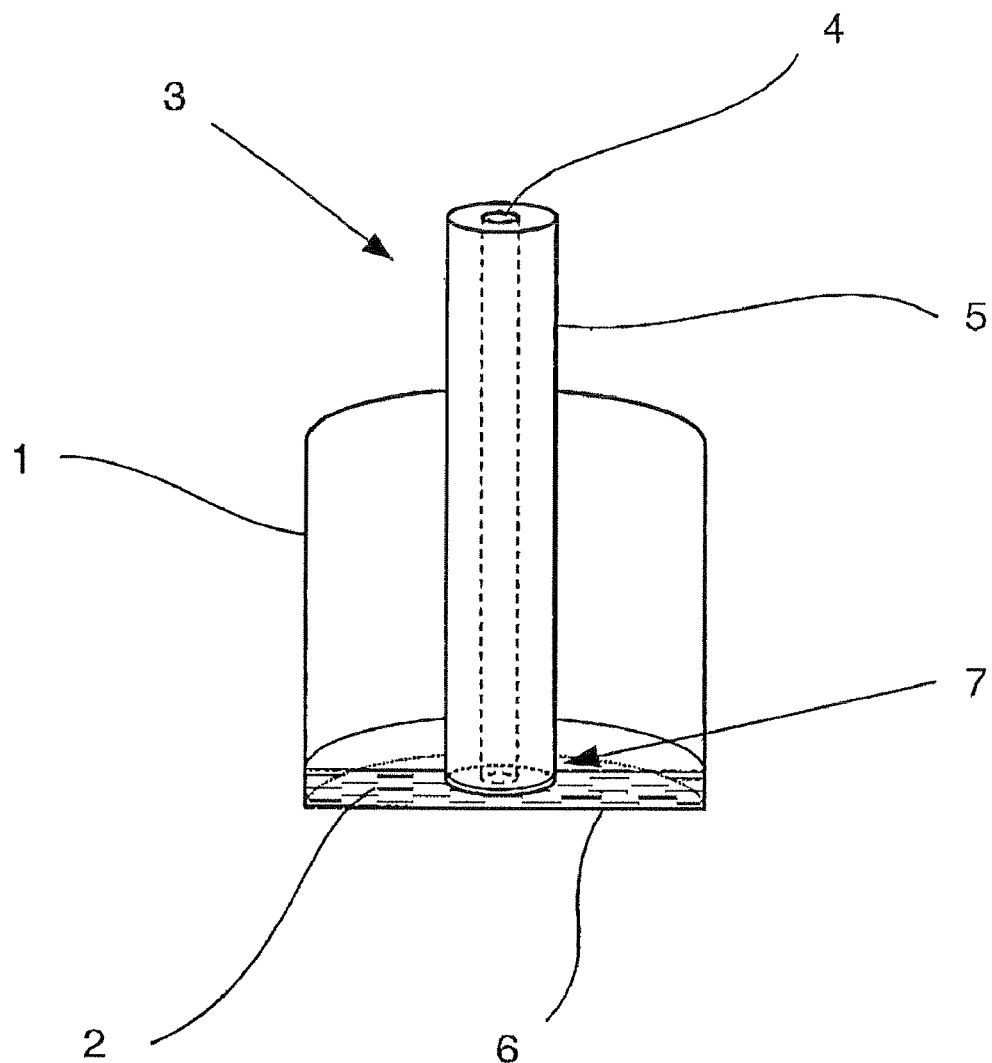
FIG. 1 is a schematic illustration of a level meter for use as specified in this invention.

FIG. 1 is a schematic illustration of a typical TDR level meter used for measuring the level of a medium 2 in a container 1. The electric conductor system 3 that conducts an electromagnetic signal into the container 1 and returns reflected components of the electromagnetic signal from the container 1 is in the form of a coaxial conductor system composed of a core conductor 4 and an outer conductor 5.

Figure 2A:
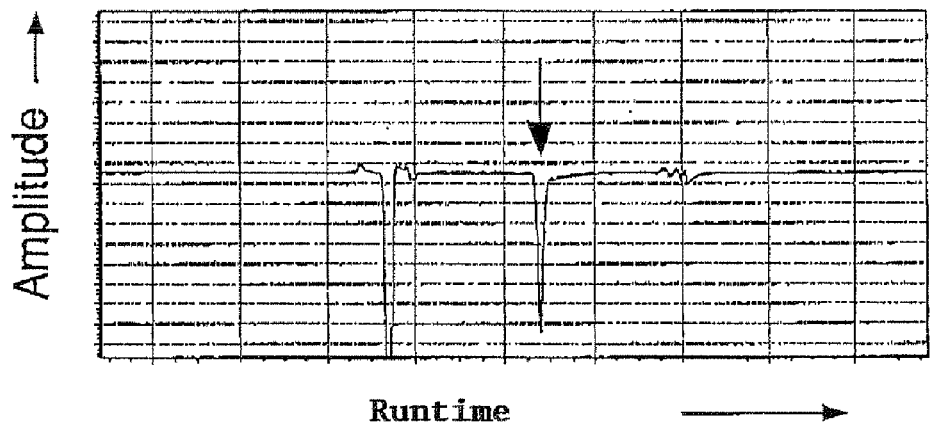
FIGS. 2a and 2b show the runtime signal prior to and, respectively, after the contact between the medium and the end of the conductor system in the FIG. 1 level meter.
Figure 2B:
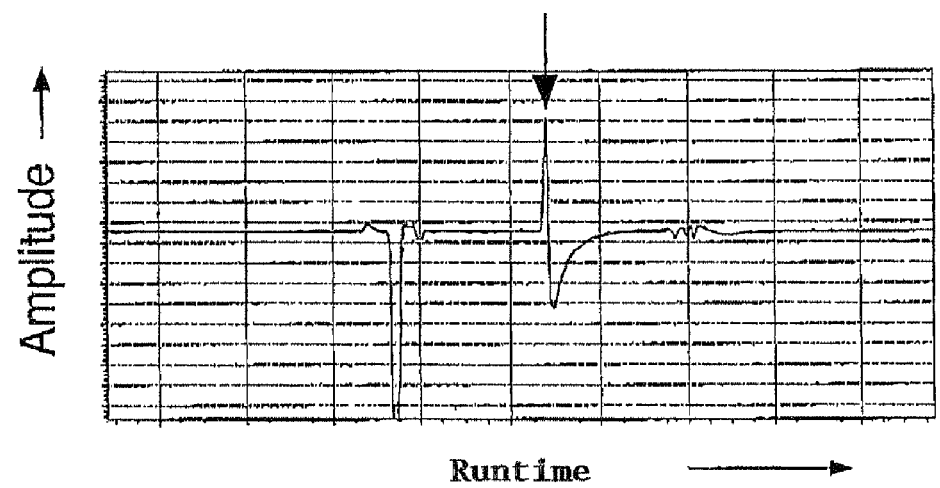

The conductor system 3 terminates in an open end 7 just above the bottom 6 of the container 1. The end 7 of the conductor system 3 defines a predetermined level of the medium 2 in the container 1. Attainment by the medium 2 of that predetermined level in the container 1 is detected in the following fashion:

As usual in the case of a TDR level meter, an extremely short electric pulse is fed into the conductor system 3, followed by the acquisition of a runtime spectrum of the reflected components. An example of such a spectrum is illustrated in FIGS. 2a and 2b, with the respective component of the electromagnetic signal reflected at the end of the conductor system 3 identified by an arrow. FIG. 2a indicates a situation where the medium 2 has not yet reached the predefined level, while FIG. 2b shows a situation where the medium 2 has just made contact with the end 7 of the conductor system 3 or has already risen beyond it. A comparison of FIGS. 2a and 2b makes it evident that contact between the medium 2 and the end 7 of the conductor system 3 results in a total polarity reversal of the reflected signal when, given an open end 7 of the conductor system as in the case shown, the medium 2 is, for instance, a liquid with a relatively high dielectric constant or high electric conductivity.

Typical applications of the invention include areas in which it is important to detect the existence of very small quantities of a liquid, for instance in the monitoring of drain pipes, spillway basins and leak detection systems. In these cases, the end 7 of the conductor system 3 may extend to a point very close to the bottom 6 of the container 1. No sump or similar provision is needed, so that there will not remain any residual medium near the measuring point after the container 1 has been emptied.

The invention claimed is:

1. A method of using a level meter based on time domain reflectometry employing the radar principle, serving to measure the fill level of a medium in a container and incorporating an electric conductor system for conducting an electromagnetic signal into the container and returning reflected components of the electromagnetic signal from the container, said electric conductor system including at least one electrical conductor extending into the container and having a distal end at a predefined fill level in the container, comprising the steps of applying an electromagnetic signal to the at least one conductor and utilizing a variation of the component of the electromagnetic signal that is reflected at said distal end as an indicator of whether the medium has reached said predefined level wherein said variation of the component of the electromagnetic signal is a polarity reversal.

2. The method as in claim 1, including the step of configuring the electric conductor system as a dual-conductor assembly composed of the two conductors.

3. The method as in claim 2, including the step of providing the dual-conductor assembly with an open end.

4. The method as in claim 2 or 3, including the step of providing the ends of the two conductors with mutually different geometric configurations.

5. The method as in claim 4, including the step of extending the two conductors into the container to different depths.

6. The method as in claim 5, including the step of providing the dual-conductor assembly in the form of a coaxial cable, having a core conductor whose end protrudes or is recessed relative to the end of an outer conductor of the coaxial cable.

* * * * *